United States Patent [19]
Freier, Sr.

[11] 3,854,573
[45] Dec. 17, 1974

[54] LOAD CARRIER WITH DUAL PIN SUSPENSION

[75] Inventor: Gerald W. Freier, Sr., Neenah, Wis.

[73] Assignee: Neenah Foundry Company, Neenah, Wis.

[22] Filed: July 30, 1973

[21] Appl. No.: 384,153

[52] U.S. Cl.............................. 198/177 R, 104/172 S
[51] Int. Cl................................................ B65g 17/20
[58] Field of Search............ 198/177 T, 177 R, 130; 248/317, 339, 489; 222/166; 105/148, 149, 152, 150; 104/172 S

[56] References Cited
UNITED STATES PATENTS

| | | | |
|---|---|---|---|
| 1,347,984 | 7/1920 | Astrom | 222/166 |
| 3,179,452 | 4/1965 | Daigle | 198/177 R |
| 3,221,866 | 12/1965 | Nash | 198/177 R |

Primary Examiner—Allen N. Knowles
Assistant Examiner—H. S. Lane
Attorney, Agent, or Firm—Joseph P. House, Jr.

[57] ABSTRACT

An overhead trolley suspends a load carrier which is provided with two pintles spaced apart from each other longitudinally of the load carrier and spaced inwardly from the ends of the load carrier. Accordingly, the center of gravity of a load carried by the load carrier can be located between said pins and an end of the load carrier. The overhead trolley has a supporting surface which receives and supports the pintles. There is an open space above the supporting member above each of the pintles so that each pintle can be lifted off of its supporting surface, whereby an unbalanced load in said load carrier causes the load carrier to tilt so that it is supported by the pintle which is nearest the load center of gravity, thereby reducing the tilting moment of the load carrier in response to an unbalanced load.

12 Claims, 6 Drawing Figures

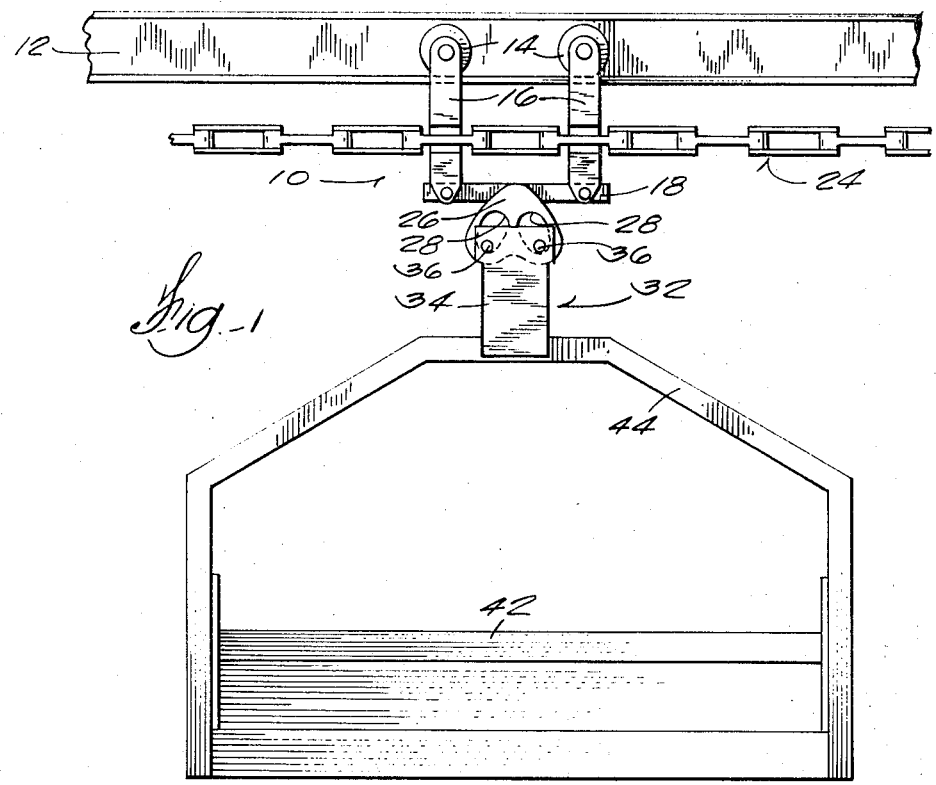
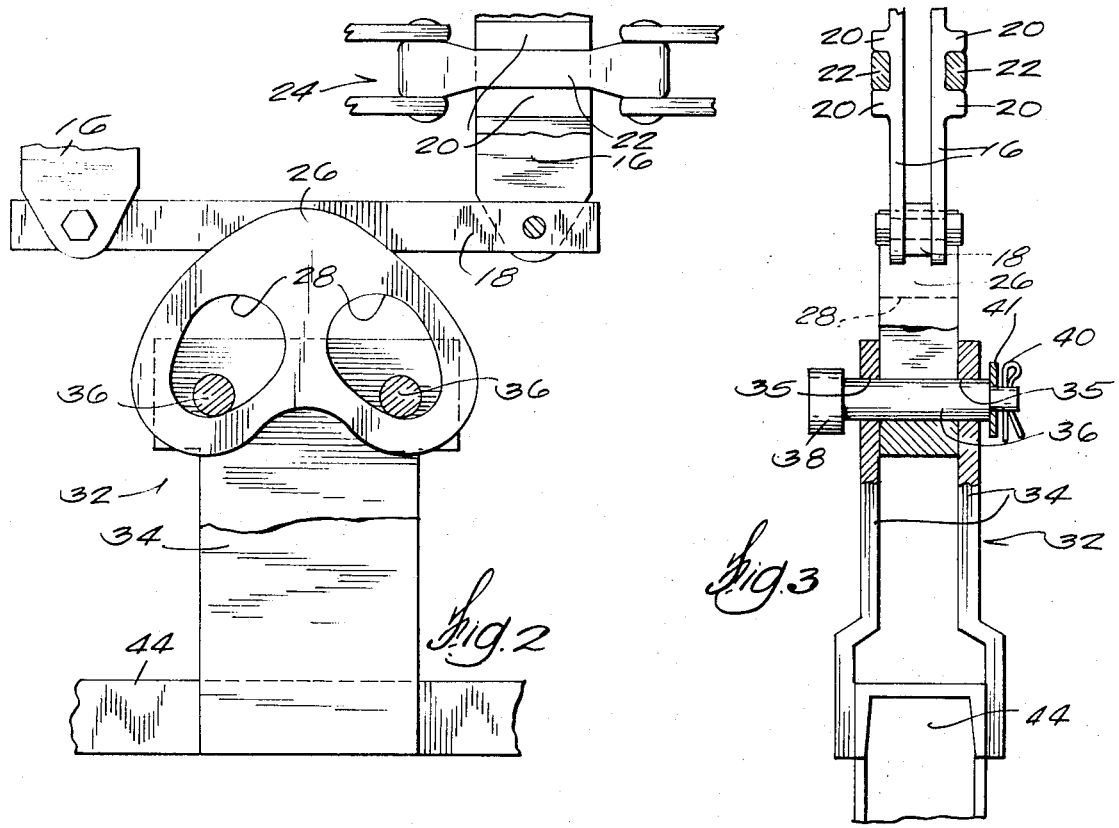

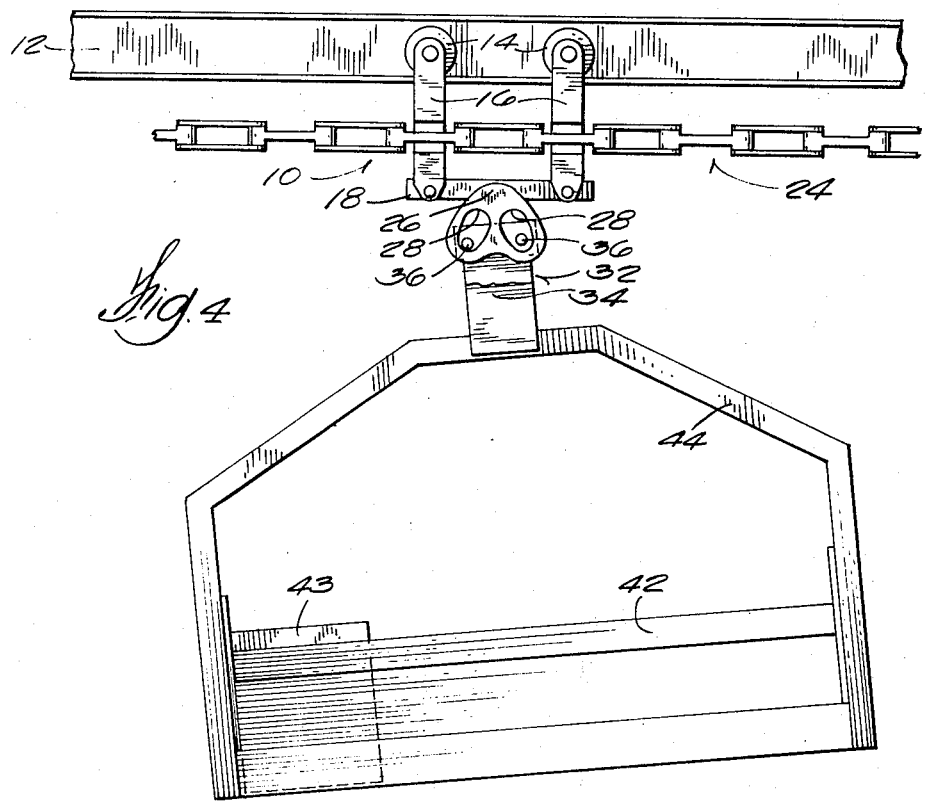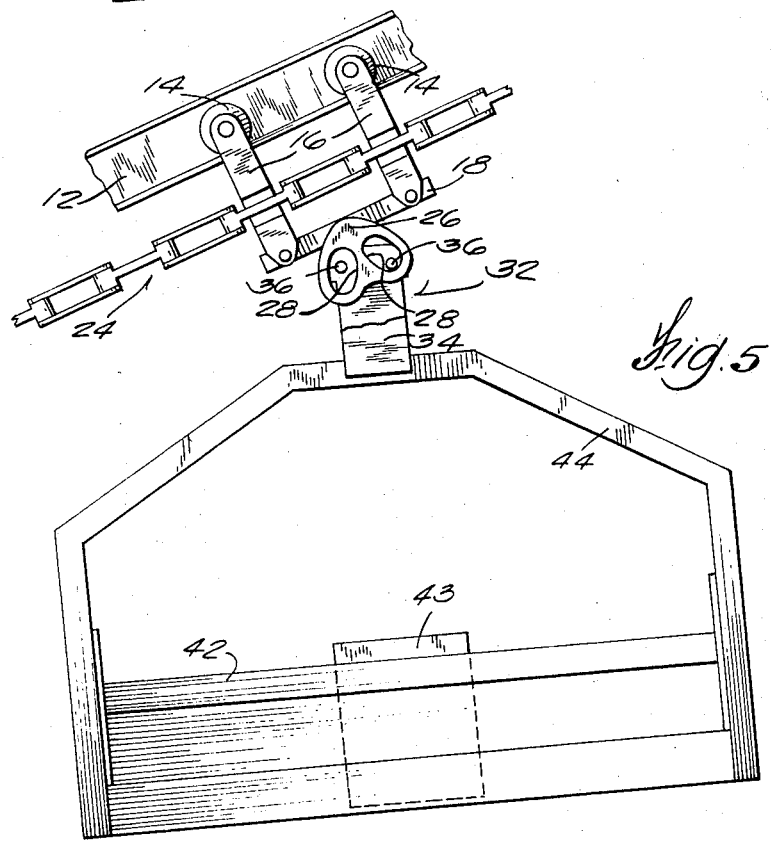

LOAD CARRIER WITH DUAL PIN SUSPENSION

BACKGROUND OF THE INVENTION

This invention relates to overhead trolley chain conveyor systems such as used for transporting parts and material within foundries, manufacturing plants, and the like, or any application where trolley conveyors have suspended loads.

Prior art overhead conveyor systems of this type typically include load carriers, trays, or baskets which are usually suspended from the conveyor track on a trolley having a pivotal support mechanism in which the load is supported by a single pivot pin. The trolley is propelled by a chain. This pivotal connection allows the load carrier to remain in the same attitude at all locations along the track, including those where the conveyor track is inclined upwardly or downwardly. Accordingly, when the track is sharply inclined, the load carrier suspension yoke may approach dangerously close or to contact the track and chain.

Moreover, when the load is unbalanced, regardless of the incline of the track, the single pin suspension allows the load carrier to tilt excessively, as it is very sensitive to unbalanced loads.

SUMMARY OF THE INVENTION

A principal object of this invention is to provide a load carrier suspension system which reduces tilting of the load carrier in response to unbalanced loads and which tends to move the load carrier away from the conveyor track and chain in locations where the conveyor is inclined upwardly or downwardly.

Another object of this invention is to provide a load carrier suspension system of the above-noted type which is relatively simple and sturdy in structure.

A further object of this invention is to provide a load carrier suspension system Of the above-noted type in which the load carrier may be easily attached to and detached from the suspension member.

In accordance with the present invention the trolley carries a load plate having two spaced openings. A carrier yoke having two correspondingly spaced support pins is suspended by the pins from the openings in the load plate. The carrier yoke overlaps the load plate and each support pin extends transversely through a corresponding one of the openings and is supported by that portion of the load plate that forms the lower margin of the opening. A load carrier is suspended from the carrier yoke. When the track and load are level, the load carrier is supported by both support pins. When the load becomes unbalanced, however, the carrier yoke tips toward its heavy side and the weight of the load is then shifted entirely to the pin which is nearest the load's center of gravity. Thus, the tilting movement of the unbalancing load is reduced, the degree of tipping of the carrier is reduced, and the carrier remains more level than it would otherwise. When the load plate itself is forced into an inclined position as the trolley negotiates an inclined conveyor rail, the support for the load carrier is automatically shifted to the support pin farthest away from the conveyor rail and the carrier becomes unbalanced with respect to its support pin and will tilt away from the inclined conveyor rail, thus to increase the clearance between the load carrier and the ocnveyor rail and chain. This action occurs even when the load carrier is carrying an otherwise balanced load.

In operation, the dual pin suspension mechanism of this invention automatically reduces the tilting movement of an unbalanced load, thus to reduce the degree of tilt of the load carrier and restore it to a more nearly level altitude. Conversely, the dual pin suspension mechanism automatically introduces tilting moment into the system whenever the trolley negotiates an inclined run of the conveyor track. The introduced tilting moment is automatically directed to tilt the load carrier away from the inclined track and chain and increase the clearance therebetween.

Other objects, advantages and features of the invention will appear from the following detailed description.

DESCRIPTION OF THE DRAWINGS

FIG. 1 is a side view of one illustrative load carrier suspension system of this invention utilized in combination with suspended conveyor.

FIG. 2 is an enlarged fragmentary detail view of the embodiment of FIG. 1 with portions thereof cut away to expose interior details.

FIG. 3 is an enlarged end view of the embodiment of FIGS. 1 and 2 with portions thereof cut away and shown in section to expose interior details.

FIG. 4 is a side view of the embodiment of FIG. 1 with an unbalanced load in the load carrier.

FIG. 5 is a side view of the embodiment of FIG. 1 with the load carrier thereof traversing an inclined conveyor rail.

DESCRIPTION OF THE PREFERRED EMBODIMENT

Figure 6:
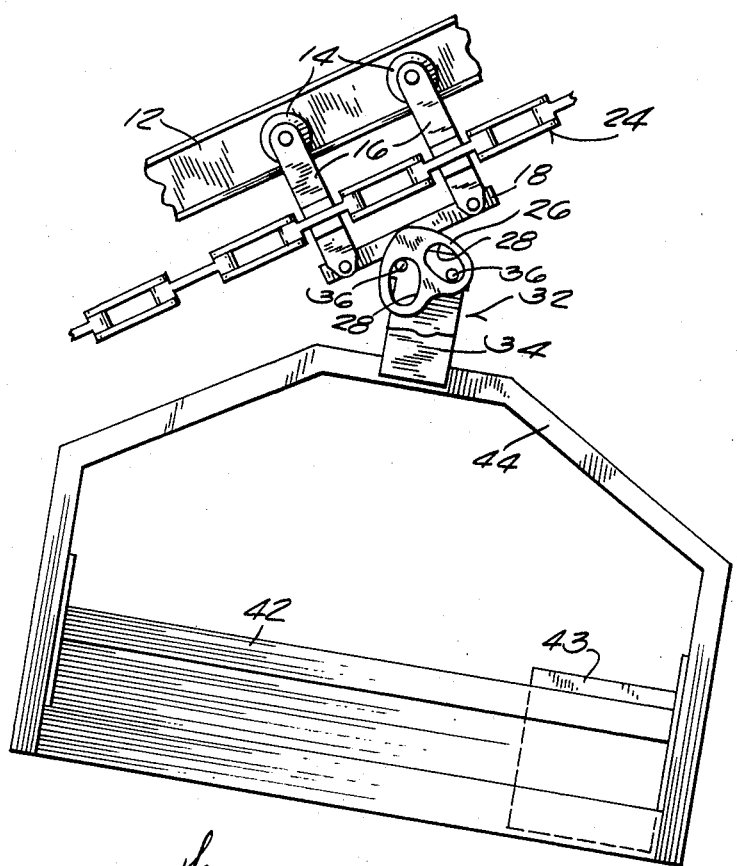
FIG. 6 is a view similar to FIG. 5, but with the load carrier tilted in the opposite direction.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The load carrier suspension system of this invention can be used in combination with any suitable conveyor system. FIG. 1 shows one suitable conveyor system and one illustrative embodiment of the invention. A trolley 10 is rollably mounted on a conveyor rail 12 by means of rollers 14. Although only two rollers 14 are visible in FIG. 1, it will be understood by those skilled in the art that four rollers are used on each trolley, the other two rollers 14 being out of sight on the other side of rail 12. The trolley 10 includes four upstanding yokes 16 which each support a roller 14 on their upper end and which are rigidly attached to a load bar 18 on their lower end. Yokes 16 are connected go conveyor chain 24 and for this purpose have two spaced raised ribs 20 in their central portion (see FIGS. 2 and 3) which are positioned to embrace a link 22 of a conveyor chain 24. It will be apparent to those skilled in the art that the complete conveyor system includes a plurality of the trolleys 10 which are spaced at intervals along the conveyor chain 24, which is preferably but not necessarily endless and extends around a closed track formed by the rail 12. The conveyor system also includes suitable prior art drive means (not shown) for moving the conveyor chain 24 around the track to move the trolleys 10 and their associated load suspension systems around the track.

Referring to FIGS. 1, 2 and 3, one embodiment of the invention includes a supporting member or load plate 26 which is rigidly attached to load bar 18 by welding, bolting or riveting and which extends downwardly below load bar 18. Two longitudinally spaced oblong openings 28 are formed in load plate 26 as best shown in FIG. 2. Hanger 32 for carrier yoke 44 is formed by two upstanding legs 34 which embrace opposite sides of the lower portion of load plate 26. Hanger legs 34 have openings 35 formed therein (see FIG. 3) to slideably receive two support pins 36, which fit relatively snugly in the openings 35. As best shown in FIG. 3, the support pins 36 have an enlarged head 38 at one end and an opening at their other end to receive a cotter pin 40. The support pins are necked down near the cotter pins 40 to receive a washer 41 which protects the cotter pins 40 from wear against the hanger legs 34. Support pins 36 are slid through a corresponding pair of the openings 35 and a corresponding one of the oblong openings 28 and extend transversely through the openings. The legs 34 of hanger 32 are supported by the pins 36, which in turn are supported by that portion of load plate 26 which forms the lower margin of openings 28. Load plate 26 is rigidly attached to the load bar 18 of trolley 10, which is rollably suspended from the conveyor rail 12. Support pins 36 are examples of any suitable pintle or hanger by which articulate suspension of the load carrier 42 from the load plate 26 is afforded.

A suitable load carrier such as a tray or basket 42 having carrier yoke 44 is rigidly attached to hanger 32 and extends downwardly therefrom. In this embodiment of the invention, the basket 42 is made of metal and is adapted to carry a plurality of metal castings 43 or the like. It should be understood, however, that loads other than casting 43 could be carried by the basket and that other types of load carriers can be utilized by the suspension system of this invention.

The legs 34 of hanger 32 embrace load plate 26 loosely enough to allow hanger 32 to tilt with respect to load plate 26 in response to an unbalanced load as shown in FIG. 4. When this occurs, the support pin 36 which is farthest from the load's center of gravity is lifted off the bottom of its opening 28 in load plate 26, thereby leaving the load supported by the support pin 26 which is nearest to the load's center of gravity. This shift of the load from both support pins 36 to the one which is closest to the load's center of gravity reduces the tilting movement and the amount of tilting with comparison to a suspension system having a single support pin. The amount of the reduction in tilting is determined by the spacing of the support pins 36; the wider apart the support pins 36 are spaced, the greater the reduction in tilting movement and the less the load carrier 42 will tilt in response to an unbalanced load. In this particular embodiment of the invention, the support pins 36 are spaced apart by approximately 3½ inches, but it will be apparent to those skilled in the art that larger or smaller spacing could be used depending on the requirements of specific applications. The openings 28 are, of course, spaced apart by the same distance as the support pins 36 and are shaped to accomodate the pins 36 during tilting.

The pintles 36 are spaced materially inwardly from the ends of the load carrier so that the center of gravity of a load carried by the load carrier can be located between said pins and an end of the load carrier.

In accordance with the present invention, tilting moment is automatically introduced into the system when the trolley negotiates an inclined run of conveyor track. This is illustrated in FIG. 5, in which the load on carrier 42 is balanced. If a single pin suspension of the prior art was used, the carrier 42 would remain level, thus bringing the carrier yoke 44 dangerously close to the inclined run of track 12 and chain 24.

In the dual pin suspension system of this invention, however, the load plate 26 will tilt automatically to lift the opening 28 which is farthest away from lower reach of the inclined track 23 and chain 24, and shift support of the carrier to the support pin 36 which passes through the uppermost opening 28. This introduces tilting moment into the system and causes the load carrier 42 to tilt away from the conveyor track 12 and chain 24 to provide increased clearance between the yoke 44 of load carrier 42 and the conveyor track 12 and chain 24. The amount of such tilting is determined by the spacing between the support pins 36 and the distribution of the load in load carrier 42. The greater the space between pins 36, the greater the tilt away from conveyor chain 24. Accordingly, even an otherwise balanced carrier 42 will tilt to achieve the foregoing objective.

The openings 28 are shaped to accommodate the pins 36 for the steepest angle of tilt between load carrier 42 and load plate 26. It is desirable for support pins 36 to contact the top edges of their corresponding openings 28, under certain circumstances, thus to limit the angle of tilt, as illustrated in FIG. 6. For this purpose, the openings 28 extend above the support pins 36 by a distance which will allow pin 36 which is nearest the lower reach of the inclined chain 24 to contact the overhanging surface or top edge of its openings 28, when the load is unbalanced as shown in FIG. 6. This limits the maximum tilt of carrier yoke 44 and prevents contact of the yoke with the chain 24 or rail 12, thereby maintaining the required clearance. By reason of the counterclockwise tilting of load plate 26, the top edge of opening 28 contacts elevated pin 36 before substantial clockwise tilting of the carrier yoke 44 occurs in FIG. 6.

In this particular embodiment of the invention, the openings 28 are oblong in shape, but this is not an essential feature of the invention, since it will be obvious to those skilled in the art that the openings 28 could be shaped as arcuate slots whose radius of curvature is equal to the distance between the pins 36. The openings 28 could also be round in shape if desired or could be any shape that permits the pins 36 to be lifted far enough off the bottom margin of the openings 28 to accommodate the maximum angle of tilt between load carrier 42 and load plate 26. Also, the two openings 28 could be replaced by a single large opening if desired. Structural design must also be considered in determining the final shape of the load plate 26.

The support pins 36 are easily removable from the openings 35 in hanger 32 and are easily replaceable therein whereby the load carrier 42 can be easily attached to load plate 26 and can be easily removed therefrom. The support pins 36 can be removed by simply disengaging the cotter pins 40 and washers 41, and then sliding pins 36 out of their openings 28 and 35 while manually supporting the load carrier basket 42.

Although this invention has been disclosed in connection with one specific embodiment, it should be understood that the invention is not limited to the disclosed embodiment since modifications can be made in the disclosed structure without departing from the fundamental principles of this invention. For example, although the disclosed embodiment utilizes a basket as a load carrier, any suitable load carrier could be employed. Also, although a conveyor having an over-head rail and a wheeled trolley are disclosed herein, any suitable conveyor means can be utilized in connection with the dual pin suspension system of this invention. These and other modifications of the disclosed structure will be apparent to those skilled in the art and this invention includes all modifications that fall within the scope of the following claims.

I claim:

1. In a suspension system for suspending a load carrier from an overhead trolley having a load carrier supporting member, the improvement in which said load carrier is provided with two pintles spaced apart from each other longitudinally of, and at the top of, the load carrier and spaced inwardly from the ends of the load carrier so that the center of gravity of a load carried by the load carrier can be located between said pins and an end of the load carrier, said supporting member having a surface for receiving and supporting said pintles, there being an open space in said supporting member above each of the pintles so that each pintle can be lifted off its supporting surface, whereby an unbalanced load so located in said load carrier causes the load carrier to tilt so that it is supported by the pintle which is nearest the load's center of gravity, thereby reducing the tilting moment of the load carrier in response to an unbalanced load.

2. The improvement defined in claim 1 wherein two spaced openings are formed in said supporting member for receiving said pintles, each of said openings extending above the corresponding pintle to allow each pintle to be lifted off its supporting surface.

3. The improvement defined in claim 1 wherein said supporting member is movably suspended from a conveyor system including a track which in portions is inclined at an acute angle to the horizontal, and wherein said supporting member inclines at an acute angle to the horizontal when it traverses the inclined portions of said track, thereby causing said supporting member to tilt and to support the load carrier by the uppermost pintle, whereby tilting moment is introduced into the system and the load carrier is tilted away from the conveyor to provide clearance between the load carrier and the conveyor.

4. The improvement defined in claim 1 wherein said supporting member is rigidly attached to a conveyor trolley, said pintles being mounted on a hanger rigidly attached to said load carrier, said hanger being shaped to embrace said supporting member and having openings therein for receiving said pintles, and said pintles extending transversely through said hanger in the region where it embraces said support member.

5. The improvement defined in claim 1 wherein said pintles are removably joined to said load carrier to permit the same to be separated from said supporting member.

6. The improvement defined in claim 4 wherein said supporting member has two spaced openings formed therein for receiving said pintles, the openings in said supporting member extending above said pintles to permit each pintle to be lifted off its supporting surface, and said pintles being inserted transversely through corresponding openings in said hanger and said supporting member to tiltably join the load carrier to the supporting member.

7. The improvement defined in claim 6 wherein said pintles have an enlarged head at one end and an opening at the other end for receiving a washer and cotter pin.

8. The improvement defined in claim 2 wherein said openings are oblong in shape.

9. The improvement defined in claim 4 wherein said hanger comprises two upstanding legs which are rigidly attached at their bottom end to said load carrier and are spaced at their upper end to embrace the lower portion of said supporting member, and openings formed in the upper ends of said legs for receiving said pintles.

10. The combination defined in claim 1 wherein said load carrier comprises a basket having a support yoke and wherein the lower portion of said upstanding legs are rigidly attached to the central portion of said yoke.

11. The improvement of claim 1 in which there is an overhanging surface above said open space which limits the upward movement of the pintles and hence limits the maximum tilt of the load carrier.

12. The improvement of claim 11 in which supporting member is movably suspended from a conveyor system including a track which in portions is inclined at an angle to the horizontal, and wherein said supporting member likewise inclines at an angle to the horizontal when it traverses the inclined portions of said track, said overhanging surface being brought closer to its pintle as a consequence of the inclined position of the supporting member, thus to limit the maximum tilt of the load carrier adjacent said inclined track portion.

* * * * *